No. 735,628. PATENTED AUG. 4, 1903.
O. E. WAXEL.
MOTOR BICYCLE.
APPLICATION FILED AUG. 25, 1902.
NO MODEL. 4 SHEETS—SHEET 1.
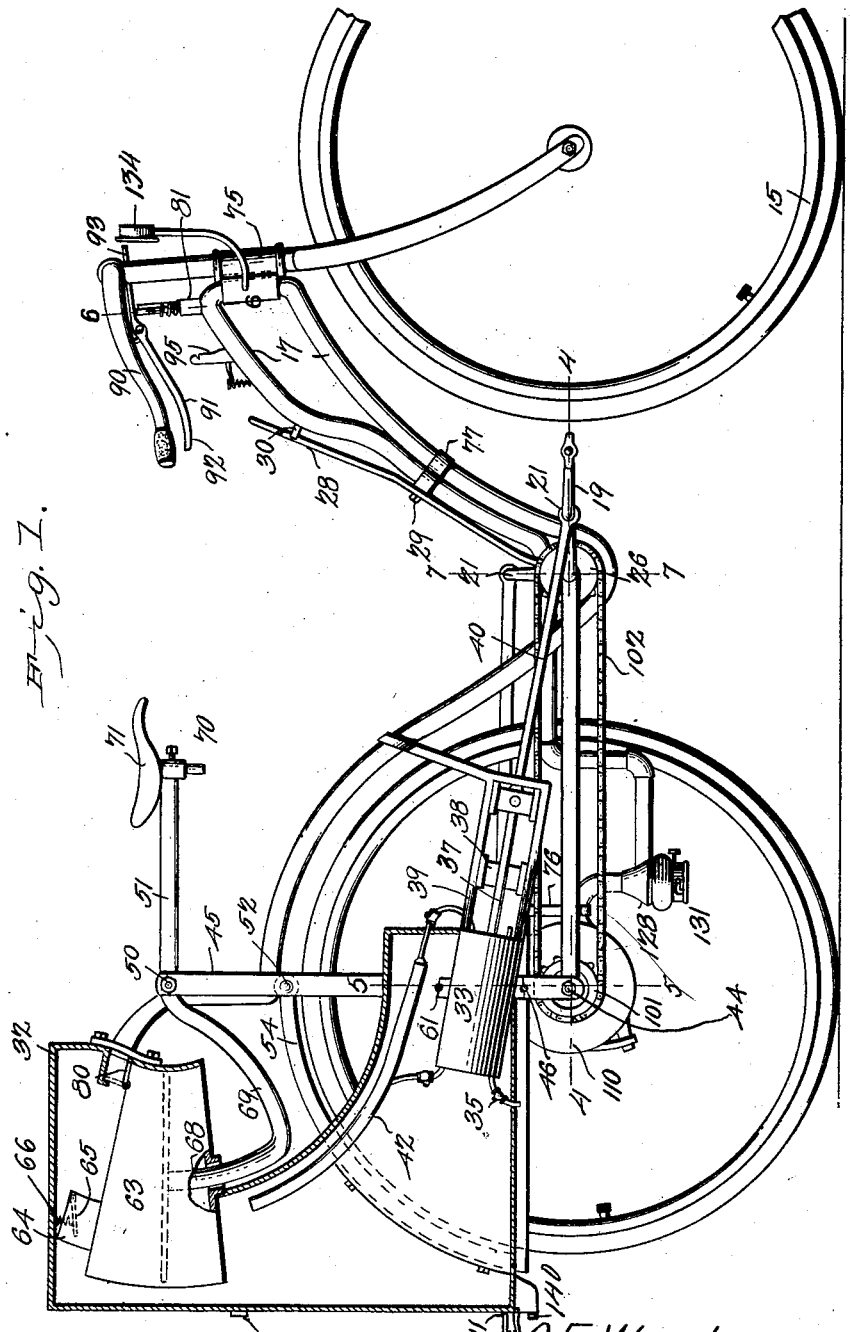
Witnesses
O. E. Waxel, Inventor.
by C. A. Snow & Co.
Attorneys

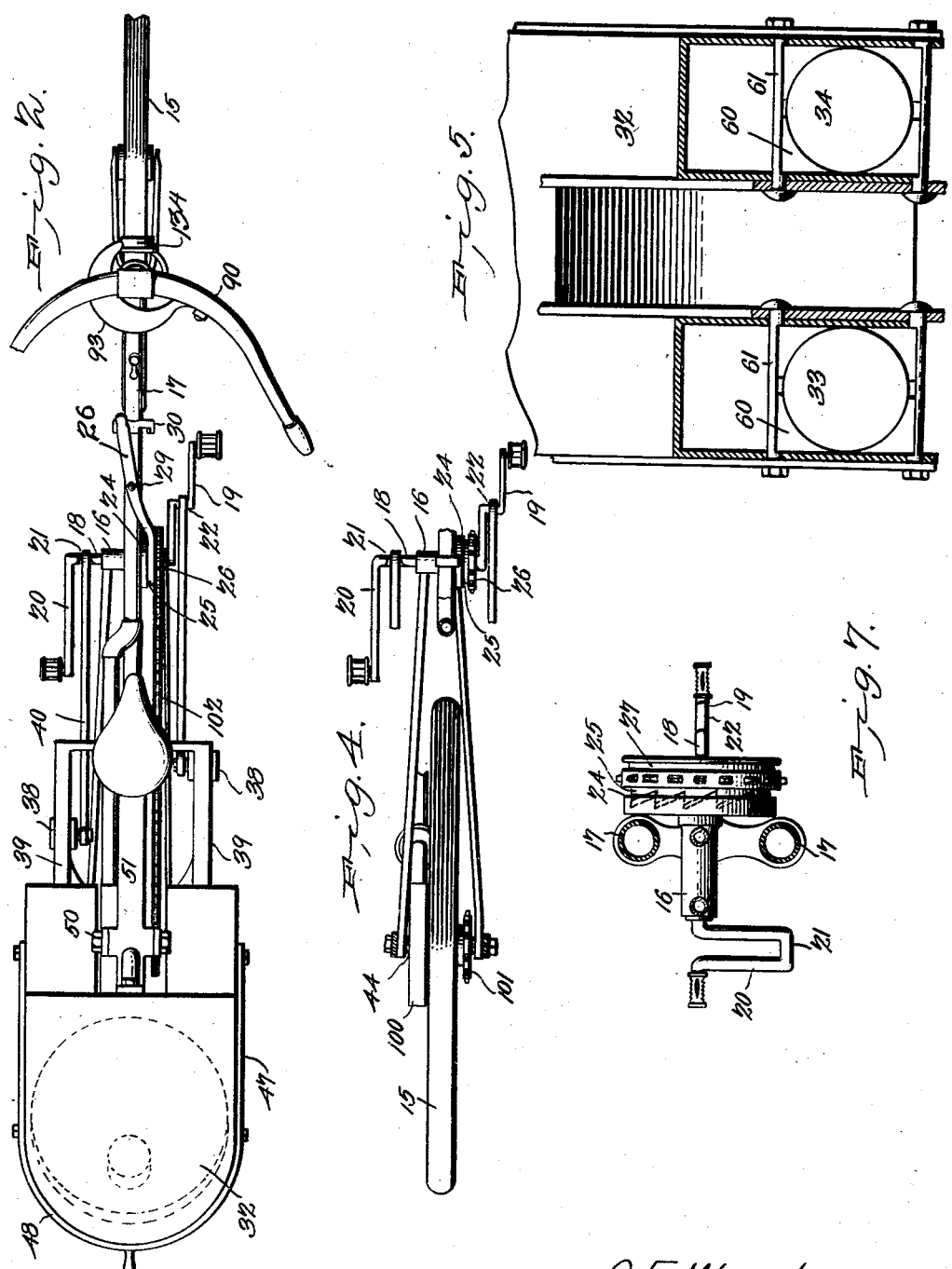

No. 735,628. PATENTED AUG. 4, 1903.
O. E. WAXEL.
MOTOR BICYCLE.
APPLICATION FILED AUG. 25, 1902.
NO MODEL. 4 SHEETS—SHEET 3.
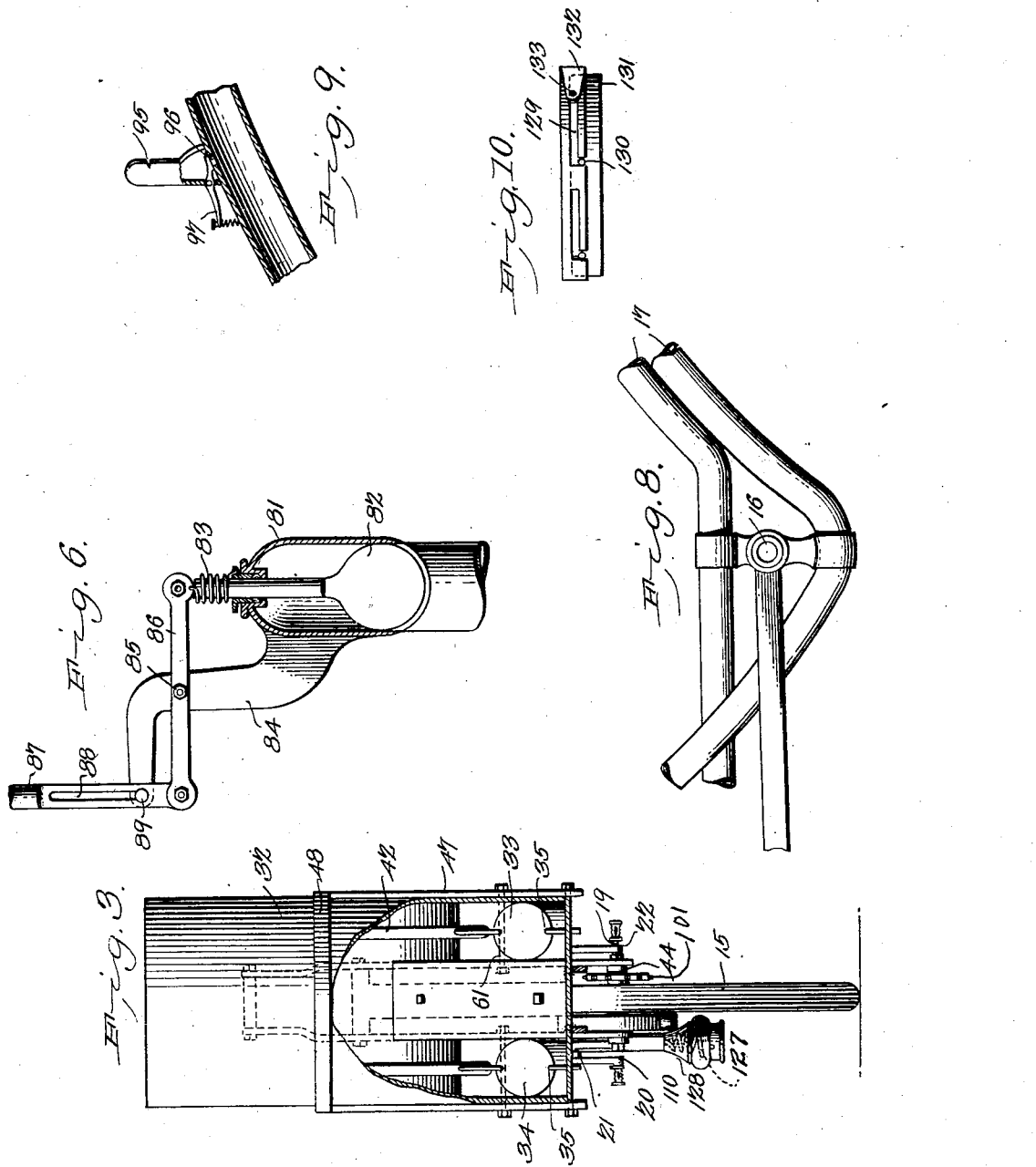
Witnesses
O. E. Waxel, Inventor.
by
Attorneys No. 735,628. PATENTED AUG. 4, 1903.
O. E. WAXEL.
MOTOR BICYCLE.
APPLICATION FILED AUG. 25, 1902.
NO MODEL. 4 SHEETS—SHEET 4.
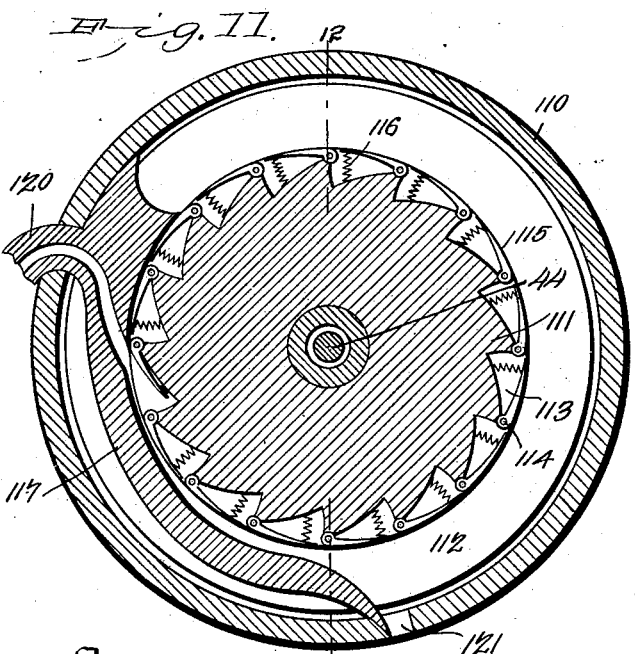
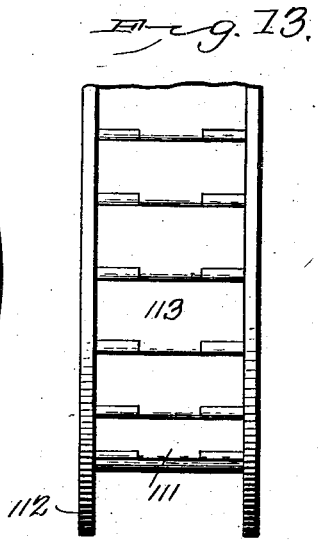
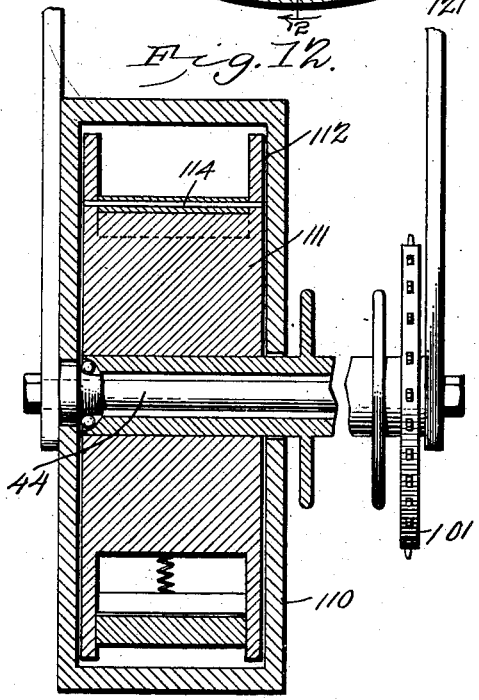
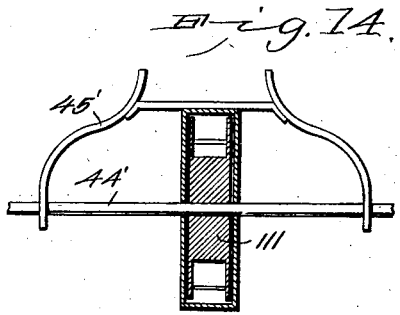
Witnesses
O. E. Waxel, Inventor.
by Attorneys No. 735,628. Patented August 4, 1903.

UNITED STATES PATENT OFFICE.

OLE E. WAXEL, OF WEST OAKLAND, CALIFORNIA.

MOTOR-BICYCLE.

SPECIFICATION forming part of Letters Patent No. 735,628, dated August 4, 1903.

Application filed August 25, 1902. Serial No. 120,971. (No model.)

*To all whom it may concern:*

Be it known that I, OLE E. WAXEL, a citizen of the United States, residing at West Oakland, in the county of Alameda and State of California, have invented a new and useful Motor-Bicycle, of which the following is a specification.

The invention relates to certain improvements in motor-vehicles, and more especially to light vehicles, such as bicycles or tricycles, and has for its principal object to construct a vehicle of this class in which air may be compressed by turning of the pedals or by the weight of the rider, or both, and afterward used as a medium for propelling the vehicle.

A further object of the invention is to so construct the device as to utilize the force of gravity in descending grades for the compression and storage of air and to arrange the mechanism in such manner that the compression devices may be utilized as brakes to retard the speed of the vehicle in descending a grade.

A still further object of the invention is to provide a motor-vehicle in which compressive fluid is utilized as a source of power, with means for heating and expanding the fluid before the pressure and energy is turned into motion in order to increase the pressure and expansive force of the fluid.

A still further object of the invention is to provide a device of this character in which the weight of the rider may be utilized to compress the air and at the same time employ a portion of the air-compression mechanism to form a pneumatic cushion for the rider.

A still further object of the invention is to employ a tubular supporting-frame as a portion of the air-reservoir and as a means for conveying the compressed air from the main reservoir to the motor.

A still further object of the invention is to provide means whereby the operator may employ the pedals directly for the compression of air or partly for the compression of air and whereby the pedal-shaft may be clutched to the rear wheel or axle of the machine and the rotations of the latter in descending a grade utilized for the purpose of compressing and storing air.

A still further object of the invention is to provide means whereby the compressed air may be utilized for sounding a whistle or similar alarm and for filling the tires of the vehicle-wheels.

A still further object of the invention is to provide an improved form of motor whereby the pressure and expansive force of the actuating fluid may be utilized to the fullest advantage.

With these and other objects in view the invention consists in the novel construction and arrangement of parts hereinafter described, illustrated in the accompanying drawings, and particularly pointed out in the appended claims.

In the accompanying drawings, Figure 1 is a side elevation, partially in section, of a motor-bicycle constructed in accordance with my invention, a portion of the frame and air-reservoir being broken away in order to more clearly illustrate the construction. Fig. 2 is a plan view of the same. Fig. 3 is a rear elevation of the bicycle, a portion of the reservoir being broken away to show the location of the preliminary compression-cylinders. Fig. 4 is a sectional plan view of a portion of the bicycle on the line 4 4 of Fig. 1. Fig. 5 is a transverse sectional elevation of the mechanism on the line 5 5 of Fig. 1. Fig. 6 is a similar view on the line 6 6 of Fig. 1. Fig. 7 is a transverse sectional elevation through the crank-axle on the line 7 7 of Fig. 1. Fig. 8 is a detail view of a portion of the frame, illustrating the crank-axle support. Fig. 9 is a detail sectional view of the alarm-whistle. Fig. 10 is a detail elevation of the supporting device for the lamp employed to heat the air in advance of its admission to the motor. Fig. 11 is an enlarged sectional elevation of an air-motor which it is preferred to employ. Fig. 12 is a transverse sectional elevation of the same on the line 12 12 of Fig. 11. Fig. 13 is a detail plan view of a portion of the twisting of the motor. Fig. 14 is a view showing the mounting of the motor and the arrangement of the rear end of the frame when the apparatus is employed in connection with a tricycle or other vehicle having more than two wheels.

Similar numerals of reference are employed to indicate corresponding parts throughout the several figures of the drawings.

The device forming the subject of the present invention is applicable to vehicles of every description; but in the drawings I have illustrated its application to a bicycle as representing the most simple embodiment of the invention.

The front and rear supporting-wheels 15 may be of the usual type and connected by a supporting-frame of a character somewhat similar to the ordinary drop-frame employed in safety-bicycles, the construction of the frame being modified in order that the tubes may be utilized for retaining and conveying compressed air to the motor.

The crank-hanger 16 is supported by the upper and lower portions of a tube 17 and is provided with the usual ball-bearings for the reception of a pedal-shaft 18, having at its outer ends pedal-cranks 19 and 20, to which are attached the usual pedals. The pedal-cranks are arranged diametrically opposite each other, and the crank-shaft 18 is bent to form a crank 21 in a plane at right angles to both the pedal-cranks. At the opposite side of the machine the pedal-crank 20 is bent in such manner as to form an auxiliary crank-pin 22, located in the same horizontal plane as the two pedal-crank pins. To the pedal or crank shaft is secured a flanged clutching-disk 24, with which may engage a similar disk 25, projecting from the inner face of a sprocket-wheel 26, the latter being loose on the shaft and rotating only when the machine is going downgrade. At one side of the sprocket-wheel is a grooved disk 27, with which may engage the end of a clutch-operating lever 28, fulcrumed at 29 to a stud carried by the frame, the free end of the lever extending out to a convenient point within reach of the rider and the frame being provided with a bar 30, having a series of catches for holding said lever in any position to which it may be adjusted and retaining the clutch member 25 in engaged or disengaged position.

The framework at the rear of the machine is adapted for the support of a tank 32, in which air is stored under pressure, and at the lower front portion of the tank on each side of the rear wheel are initial compression-cylinders 33 34, disposed wholly within the tank and communicating at each end with the atmosphere through pipes 35, having inwardly-opening check-valves of any ordinary construction. The cylinders contain pistons of ordinary construction (not shown) connected to rods 37, which are connected to cross-heads 38, adapted to guides 39, carried by the frame, the cross-heads being connected by rods 40 to the cranks 21 and 22, and as said cranks are disposed at a right angle to each other one of the pistons will always be at full stroke while the mating piston is at half-stroke. The pistons are reciprocated by the cranks, and the air drawn in through the pipes 35 is expelled through pipes 42 to the tank, there being outwardly-opening check-valves in said pipes 42 to prevent the return of air from the tank to the cylinders. The discharge-pipes 42 are connected to the upper portion of the tank 32 in order to discharge the compressed air at a point above the initial compression-cylinders, the air at this time being heated by the act of compressing and after being discharged into the tank gradually losing its heat and the cooler air sinking to the lower portion of the tank and acting in a measure to cool the initial compression-cylinders.

The storage-tank 32 is situated partly on each side and partly to the rear of the driving-wheel, the central portion of the tank-casing being recessed to accommodate the curvature of the rear wheel. Extending vertically from the rear-wheel axle 44 are two bars 45, connected at the upper ends by a bolt 50, which also forms a fulcrum for a saddle-supporting bar 51. At a point below the bolt 50 is a transverse bolt 52, extending through both bars and through the upper end of a curved bar 54, which closely follows the contour of the rear wheel and at its rear end is bifurcated, one arm extending on each side of the driving-wheel at a point under the tank and forming at its forward end a support for the cross-head guides 39. These arms are further connected with the vertical bars 45 by transverse bolts 46, which also serve as supports for the initial compression-cylinders. A portion of the upper surface of the tank 32 is curved on the arc of a circle struck from the bolt 50 at its center, and on each side of the tank and closely following this curved line is a bar 47, the upper and rear end of said bars being connected by a strap 48, encircling the rear portion of the tank. The front ends of the bars 47 are turned downwardly in the plane of the bars 45 and fit closely against the outer faces of the tank.

The initial compression-cylinders are each surrounded by blocks 60, of the character more clearly shown in Fig. 5, the upper and lower faces of said blocks being grooved for the passage of securing-bolts. The bolt 46, previously referred to, extends through one of the vertical bars 45 at each side of the machine, thence through the bifurcated arm of the bar 54, the lower groove of the block 60, and the outer bar 47 of the supporting-frame and is provided with a suitable clamping-nut by which all of these members may be held together on the bolt. The upper groove of the block 60 receives a bolt 61, which extends through one of the inner bars 45 and both walls of the tank and thence through the outer bar 47 and is provided with a similar nut, the whole forming a thoroughly-braced and rigid frame for the support of the air-tank and the compression-cylinder. In the upper portion of the tank is a secondary compression-cylinder 63 of any desired form in cross-section, the upper portion of said cylinder communicating with the tank through an opening 64, having an inwardly-opening valve 65, which is acted upon by a spring 66, normally tending to move said valve to open position. The cylinder contains a closely-fitting piston 68, connected by a curved rod 69 to the rear end of the saddle-supporting bar 51, and at the front end of the saddle-bar is a socket for the reception of a saddle-post 70, to which is pivoted a saddle 71. The piston 68 is forced upwardly by the weight of the rider on the saddle 71, and under normal conditions the air in the cylinder 63 above said piston will form a cushion for the rider.

The rear end of the tube 17, which forms the main portion of the frame, is rigidly secured to the tank 32, and thence extends to a suitable opening in the bar 51 and downwardly between the two vertical bars 45, to which it is rigidly secured. The tube members 17 thence follow the curvature of the rear wheel, extending below the crank-hanger, and thence to the fork-crown 75 at the front of the machine. The tube is coupled to the fork-crown and is thence bent rearwardly and downwardly, extending above the crank-hanger and along one side of the rear wheel to the air-heater and the motor. The tube is provided with a hanger 76, which affords a partial support for the cross-head guides 39, and at a point in advance of the crank-hanger the two portions of the tube are united by a clamp 77, which forms a support for the pivot-pin 29 of the clutch-operating lever.

At the upper portion of the cylinder 63 is an outwardly-opening valve 80, which when opened by the pressure of air between the cylinder 63 places said cylinder in communication with the tube 17. The air is then forced through said tube to the motor, it being understood that the tube is provided with a suitable valve for controlling the passage of the air to said motor. In the operation of this portion of the mechanism the rider turns the pedal-cranks until the air offers considerable resistance in the cylinders 33 and 34, this being an indication that the air in the reservoir is under high pressure. The pedal-cranks are then turned until both assume a horizontal position, the rider rising from the saddle and standing on the pedals. As soon as the saddle is relieved from the weight of the rider air from the tank will force its way through the opening 64 into the cylinder 63 and will depress the piston 68 therein. The rider reassumes his position in the saddle, the weight causing an upward movement of the piston 68 and the opening of the valve 80, the air in the cylinder passing into the tube 17. Normally the tube is in direct communication with the reservoir and is filled with air under pressure; but when a portion of the air in the reservoir flows into the cylinder 63 and is there subjected to the weight of the rider the valve 80 is moved to such position as to cut off communication between the reservoir and the tube 17 and establish communication between the cylinder and said tube.

Near the upper front end of the tube 17 is a casing containing a valve-chamber 81, in which is a slidable valve 82, normally held directly across the bore of the tube by a spring 83, thus shutting off the air from the motor. From the valve-casing extends an arm 84, carrying a stud 85, on which is pivoted a lever 86, having one end pivotally connected to the stem of the valve 82 and its opposite end being connected in a similar manner to a vertically-disposed bar 87. The bar 87 has a vertical slot 88 for the reception of a pin 89, projecting from the arm 84, said pin serving to maintain the bar 87 in proper position. To the under side of the handle-bar 90 is pivoted an operating-lever 91, having a grip 92, disposed adjacent to one of the handles and provided at its opposite end with a curved plate 93, adapted for contact with the top of the bar 87, the curvature of said plate being such that it will always be in position to make contact with the bar without regard to the angular position of the handle-bars. The grip of the actuating-lever is within convenient reach of the rider, and the latter by drawing the grip in the direction of the handle may cause the opening of the valve 82 to any desired extent, and thus govern the quantity of air supplied to the motor.

At a convenient point on the tube 17 is a whistle 95, communicating with the tube through an opening 96, which is normally closed by a spring-actuated valve 97. When it is desired to sound the whistle, the valve is opened and air admitted through the opening 96, the valve automatically returning to closed position when released.

The rear-wheel axle 44 is provided with an elongated hub 100 for the support of the rear wheel, and to the hub is secured a sprocket-wheel 101, intermeshing with a link belt 102, which passes over the sprocket-wheel 26 on the crank-shaft. Normally the sprocket-wheel 26 is loose on the crank-shaft and is not turned by the operator; but when the machine is descending an inclined plane the clutch-lever 28 is shifted to move the clutching-disk 25 of the sprocket-wheel into engagement with the flanged disk 24, carried by the crank-shaft, in order that the rotative movement of the rear wheel may be imparted to the crank-shaft and from thence to the reciprocating pistons of the initial compression-cylinders, the power which would otherwise be wasted being stored in the form of compressed air and utilized for driving the machine. By thus coupling the rear wheel to the pistons the latter may be employed as brakes to partly retard the descent of the machine, and if this be insufficient the rider may further retard the movement of the machine by back pedaling in the usual manner.

Mounted loosely on the rear-wheel hub 100 and suitably supported thereon is a motor-cylinder 110 of the character best shown in Figs. 11 and 12. In this cylinder is a piston 111, which is rigidly secured to the rear-wheel hub and is adapted to rotate and drive the rear wheel. The hub is provided with a peripheral groove, forming two oppositely-disposed flanges 112, and the body portion of the piston between these flanges is further cut away to form a plurality of abutments 113, somewhat in the nature of ratchet-teeth, each abutment having a substantially radial face against which the compressed air impinges to revolve the piston and the curved face extending between the outer wall of one abutment to the bottom portion of the next adjacent abutment. Extending between the flanges and the piston are a number of pins 114, one of which is situated at the apex of each of the teeth, and on each pin is mounted a segmental plate 115 of a width equal to the width of the peripheral groove in the piston and of a length sufficient to fit closely against the pivoted end of the next adjacent plate. These plates are projected by springs 116 until their outer faces are in circumferential alinement with the flanges of the piston and serve to prevent the entrance of air into the spaces in which the springs are contained. Within the cylinder and fitted between the two flanges of the piston is a curved bar or plate 117, the upper surface of which fully closes the space formed between the inner wall of the cylinder, the flanges of the piston, and the plates 115, while that face of the bar or plate nearest to the piston is curved on a line eccentric to the center of the piston and forms a gradually-expanded chamber, into which the abutments are successively brought as the piston rotates and subjected to the action of a current of air entering the cylinder through an inlet-port 120. The entering jet of air when brought into contact with one of the plates 115 immediately depresses the plate against the action of its spring 116, the substantially radial face of the abutment being subjected to the full pressure of air and causing a revoluble movement of the piston. As the abutments successively pass beyond the influence of the jet of air the plates are again forced out by the springs and reassume their normal position in circumferential alinement with the flanges of the piston, the air finally escaping through an outlet-port 121. The bar or plate 117 is supported at the lower end by an arm 122, depending from one of the vertically-disposed bars 25, and from said bar projects an arm 123, connected by an arm 124 to the opposite end of said plate. The motor thus formed will fully utilize the pressure of air, and the construction and arrangement of the abutments are such that all back pressure will be prevented. The motor may be supplied directly from the air-reservoir; but in order to increase its volume and effective force I prefer to heat the air in advance of its admittance to the motor.

The rear end of the air-conveying tube 17 is connected to the lower end of a worm 127 and its upper end connected to the inlet-port of the motor. The worm is surrounded by an open-bottom casing 128 of suitable size and shape, the lower flange of said casing being provided with a plurality of slots 129, into which fit pins 130, projecting from the sides of a lamp-holder 131, the pins and slots forming a bayonet-joint connection between the lamp and the casing. The casing is further provided with a spring-tongue 132, having an opening 133, into which one of the pins is forced as the lamp member is turned around, the tongue yielding to permit the pin to pass under the edge of the tongue and into said opening. The heating of the air is found to materially increase its efficiency at but trifling cost, and should the lamp become broken or damaged the machine may proceed under pressure direct from the reservoir. In order that the rider may at all times be informed of the pressure of air within the reservoir, it is preferred to place a small pressure-gage 134 at the front of the machine, said gage being connected to the tube 17 in advance of the valve 82.

This mechanism may be applied to vehicles of any description and employed in the place of the more expensive gas, steam, or electric motors in common use on automobiles.

In Fig. 14 I have illustrated a motor mechanism as applied to the rear axle of a tricycle or similar vehicles. In this case the rear axle 44' is of greater length than that shown in Fig. 12 and is provided with two permanently-secured wheels, one at each end of the axle. The sprocket-wheel 101' and the piston 111 of the motor are secured directly to the axle, while the main frame-bars 45' are bent outwardly and arranged adjacent to the inner ends of the wheel-hubs.

The tank is provided at a convenient point with a nipple 140, communicating with the interior of the reservoir and normally closed by a spring-pressed valve 141. This nipple may serve for a hose connection when the wheel-tires are to be inflated or may be attached to a suitable pump or compressed-air reservoir in order to fill the tank with compressed air at the starting of a trip.

While it is preferred to employ a motor of the construction shown in Figs. 11 and 12, it will be understood that the apparatus may be employed in connection with a device of any character capable of transforming pressure into motion.

While the construction herein described and illustrated in the accompanying drawings is the preferred form of the device, it is obvious that various changes in the form, proportions, size, and minor details of the structure may be made without departing from the spirit or sacrificing any of the advantages of the invention.

Having thus described my invention, what I claim is—

1. In a motor-vehicle, an air-reservoir, air-compression cylinders discharged into said reservoir, pistons in said cylinders, means for actuating the pistons, a secondary compression means in communication with the reservoir and operable by the weight of the rider, and an air-actuated motor connected to and adapted to propel the vehicle.

2. In a motor-vehicle, an air-reservoir, a pair of initial compression-cylinders disposed within the reservoir and acting to discharge the air thereinto, pedal-actuated pistons in said cylinders, a secondary compression-cylinder receiving air from said reservoir, a piston in the secondary cylinder, a saddle connected to the piston for transmitting the weight of the rider thereto, and means for transforming the air-pressure into motion for propelling the vehicle.

3. In a motor-vehicle, a pedaled crank-shaft, an air-reservoir, a pair of cylinders connected to the reservoir, pistons disposed in said cylinders and connected to the pedal-cranks, a secondary compression-cylinder receiving air from said reservoir, a piston in the secondary cylinder, a pivoted bar having one end operably connected to said piston, a seat or saddle disposed on the opposite end of said bar, and means for transforming the air-pressure into motion for the propulsion of said vehicle.

4. The combination in a motor-bicycle, of an air-reservoir, a pair of compression-cylinders disposed within the lower portion of said reservoir and surrounded by the air contained within the reservoir, discharge-pipes leading from the compression-cylinders to the upper portion of the reservoir to permit the cooler air at the lower portion of the reservoir to lower the temperature of the compression-cylinders, a pedaled crank-shaft, pistons disposed in cylinders and connected to the pedal-cranks, a motor connected to the driving-wheel of the bicycle, and a tube extending from the reservoir to the motor.

5. The combination in a motor-bicycle, of the rear wheel, the rear-wheel hub and axle, an air-motor connected to the hub, vertically-disposed frame members extending from the shaft, a saddle-supporting bar pivotally connected between the upper portion of said members, a curved bar connected at its front end to the frame members and following the contour of the upper rear portion of the wheel, the lower portion of said bar being bifurcated and forming arms extending on each side of the rear wheel to a point of connection with the vertically-disposed frame member, a compressed-air reservoir surrounding a portion of the wheel and partly supported by the frame members and bars, auxiliary clamping-bars extending around the outer portion of the reservoir and rigidly connected to said frame members, and an air-conducting tube leading from the reservoir to the motor.

6. The combination in a motor-bicycle, of the front and rear wheels, a frame, a motor operatively connected to the rear wheel, an air-reservoir, air-compression cylinders for forcing air into said reservoir, an auxiliary cylinder disposed within and receiving air from the reservoir, a piston in said auxiliary reservoir, a pivotally-mounted saddle-supporting bar connected at one end to said piston, a saddle disposed to the opposite end of said bar, an auxiliary frame supporting the reservoir and extending from the rear-wheel axle to a point of connection with the saddle-supporting bar, and a drop-frame connecting the reservoir and the motor and extending to the front forks of the machine, substantially as specified.

7. The combination in a motor-vehicle, of an air-reservoir, pedal-actuated compression devices for forcing air thereinto, an auxiliary compression-cylinder disposed within and receiving air from the reservoir, a piston in said cylinder, an air-conducting tube leading from the reservoir, an air-actuated motor to which the opposite end of said tube is connected, and a valve for cutting off communication between the reservoir and the tube and for placing the auxiliary cylinder in communication with said tube.

8. The combination in a motor-vehicle, of a pedaled crank-shaft having a clutching-disk rigidly secured thereto, a sprocket-wheel loosely mounted on said shaft and having clutching means to coöperate with the disk, means for clutching and releasing the sprocket-wheel, an air-reservoir, air-compressing cylinders, pistons disposed in said cylinders and having an operative connection with the pedaled crank-shaft, a sprocket-wheel revoluble by one of the supporting-wheels of the vehicle, and a link belt connecting the two sprocket-wheels for mechanically actuating the pistons of the compression-cylinders when the vehicle is moving by gravity.

9. The combination in a motor-vehicle, of an air-motor, an air-reservoir connected thereto, an air-compression mechanism in communication with the reservoir, a pedaled crank-shaft having an operative connection with said compression mechanism, and a clutching mechanism for operatively connecting the pedaled crank-shaft to a revoluble member of the vehicle to thereby actuate the compression mechanism when the vehicle is traveling by gravity.

10. In a device of the class specified, the combination of the steering-post and handle-bars, an air-conducting tube, a spring-closed valve disposed therein, a vertically-movable rod operatively connected to said valve, a valve-operating lever pivoted to one of the handle-bars and provided at one end with a grip adjacent to one of the handles and at the opposite end with a widened and curved plate for engagement with the bar in any position of adjustment of the steering-post.

11. In a device of the class specified, the combination of the reservoir having portions disposed on each side of the rear driving-wheel, air-compressing cylinders situated therein, pistons in said cylinders, means for actuating the pistons, grooved blocks in which said cylinders are mounted, securing-bolts passing through the sides of the reservoir and engaging the grooved blocks, an air-driven motor, and means for connecting said motor and reservoir.

In testimony that I claim the foregoing as my own I have hereto affixed my signature in the presence of two witnesses.

OLE E. WAXEL.

Witnesses:
JOHN S. WASH,
J. IRA VAUGHAN.